(12) United States Patent
Flynn

(10) Patent No.: US 7,214,006 B2
(45) Date of Patent: May 8, 2007

(54) HELICAL FLUTE END MILL WITH MULTI-SECTION CUTTING SURFACE

(75) Inventor: Clifford M. Flynn, Pittsfield, MA (US)

(73) Assignee: Dauphin Precision Tool, LLC, Millersburg, PA (US)

( * ) Notice: Subject to any disclaimer, the term of this patent is extended or adjusted under 35 U.S.C. 154(b) by 0 days.

(21) Appl. No.: 10/931,741

(22) Filed: Sep. 1, 2004

(65) Prior Publication Data

US 2006/0045638 A1    Mar. 2, 2006

(51) Int. Cl.
*B23C 5/10*    (2006.01)

(52) U.S. Cl. ............... 407/53; 407/54; 407/61

(58) Field of Classification Search .......... 407/30, 407/53, 54, 60–63; 408/230
See application file for complete search history.

(56) References Cited

U.S. PATENT DOCUMENTS

| | | | | |
|---|---|---|---|---|
| 750,537 | A | * | 1/1904 | Hanson .................. 408/230 |
| 1,407,546 | A | * | 2/1922 | Alexander ............... 408/223 |
| 2,778,252 | A | * | 1/1957 | Oxford, Jr. .............. 408/230 |
| 5,049,009 | A | * | 9/1991 | Beck et al. .............. 407/54 |
| 5,078,554 | A | * | 1/1992 | Kubota ................... 408/230 |
| 5,160,232 | A | | 11/1992 | Maier ..................... 51/2 |
| 5,622,462 | A | * | 4/1997 | Gakhar et al. .......... 408/230 |
| 6,007,276 | A | | 12/1999 | Wardell .................. 407/54 |
| 6,168,355 | B1 | | 1/2001 | Wardell .................. 407/54 |
| 6,179,528 | B1 | | 1/2001 | Wardell .................. 407/54 |
| 6,368,030 | B1 | * | 4/2002 | Sato et al. ............... 407/53 |
| 6,439,811 | B1 | | 8/2002 | Wardell .................. 407/54 |
| 2001/0018011 | A1 | * | 8/2001 | Volokh ................... 407/54 |
| 2003/0118411 | A1 | | 6/2003 | Flynn et al. ............. 5/10 |
| 2004/0105729 | A1 | | 6/2004 | Giessler et al. .......... 5/10 |
| 2006/0067797 | A1 | | 3/2006 | Calamia ................. 407/53 |

FOREIGN PATENT DOCUMENTS

| | | | | |
|---|---|---|---|---|
| DE | 19910580 | C1 | * 7/2000 | |
| FR | 1190274 | | 10/1959 | |
| IT | 344883 | A | * 11/1936 | |
| JP | 62188616 | | 8/1987 | ............. 5/10 |
| JP | 62188616 | A | * 8/1987 | |
| JP | 6190622 | A | * 6/1994 | |
| JP | 2000296409 | A | * 10/2000 | |

OTHER PUBLICATIONS

International Search Report.

* cited by examiner

*Primary Examiner*—Daniel W. Howell
*Assistant Examiner*—Sara Addisu
(74) *Attorney, Agent, or Firm*—O'Shea, Getz & Kosakowski, P.C.

(57) ABSTRACT

A rotary cutting end mill is provided. The end mill includes a shank section and a fluted section. The fluted section has a first end integrally attached to the shank section, a second end, and an outer surface. One or more helical teeth are disposed along the outer surface of the fluted section. Each helical tooth has a cutting surface and a relief wall that intersect to form an angle defining a helical cutting edge. The helical cutting edge defines an outer circumferential cutting path. The cutting surface includes first, second, and third sections, and first and second take-off peaks. The first take-off peak is disposed between the first section and second section. The second take-off peak is disposed between the second section and the third section.

10 Claims, 4 Drawing Sheets

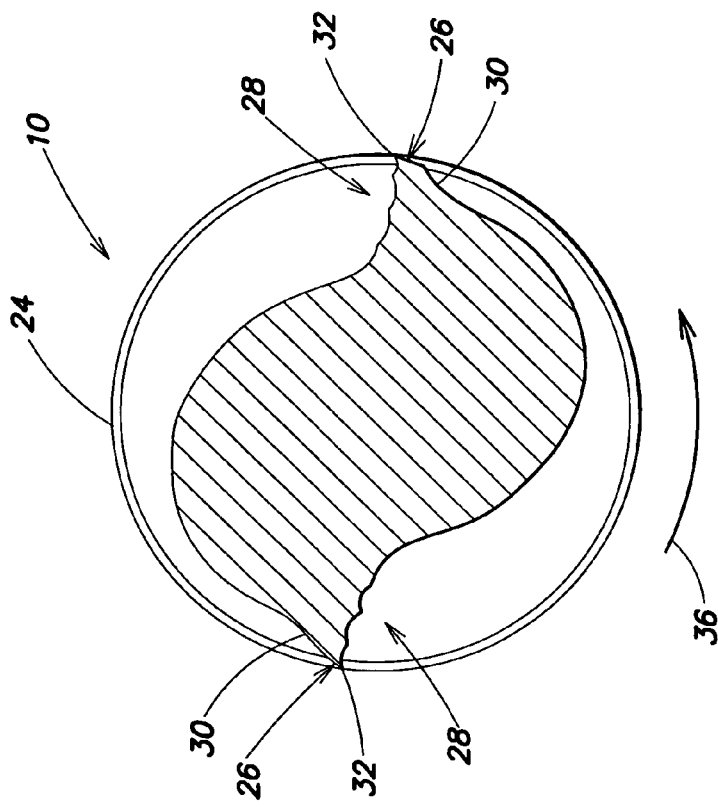
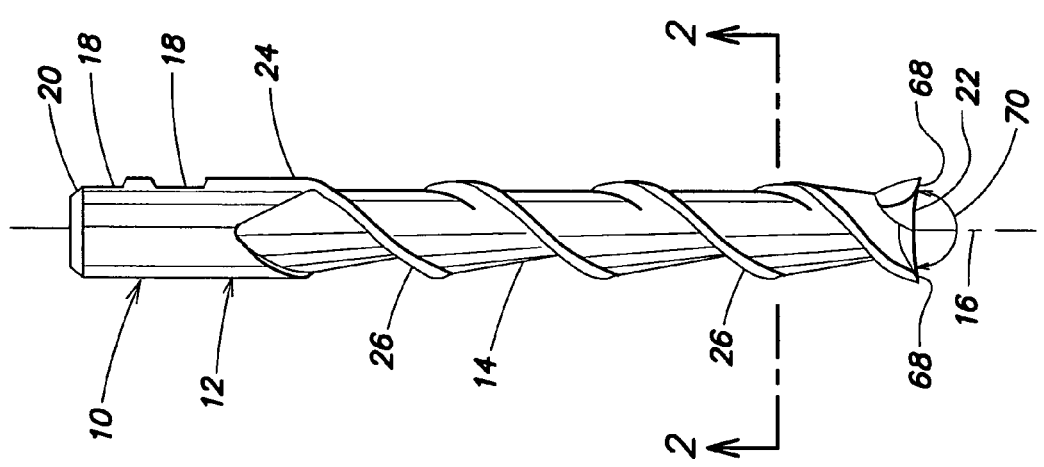

HELICAL FLUTE END MILL WITH MULTI-SECTION CUTTING SURFACE

BACKGROUND OF THE INVENTION

1. Technical Field

The present invention relates to machine tool rotary cutting tools in general, and to end mills in particular.

2. Background Information

A variety of end mills for use with rotating milling cutters are available and well known. Depending on design, such end mills are generally used in right hand cutting, right hand spiral and center cutting. Conventionally, these end mills are made from hardened steel, carbides, ceramics, etc. Standard end mills are supplied in two or more flute designs. A number of end mills have only one operating surface on the cutting face wall and one surface in the fluted area. Such end mills often have problems with chips adhering to the cutting face wall and do not achieve a cut as clean as an end mill with two operating surfaces. Another problem is chip clogging in the fluted area of the end mill.

U.S. Pat. No. 3,003,224 to Ribich discloses an end mill with two operating surfaces on the cutting face wall, a primary and a secondary tooth surface. End mills of the type disclosed within U.S. Pat. No. 3,003,224 provided an improved cut and better chip ejection than the state-of-the-art end mills then available. These end mills still have several deficiencies and limitations, particularly when used with the high speed machining capabilities of the present state of the art; e.g., the end mill has corner wear and edge chip problems; it often creates a loud, undesirable squeaking noise during use; it has a limited useful life; it cannot be effectively used above certain speeds; and it has less than desirable chip removal from the fluted area.

What is needed, therefore, is an end mill that has improved characteristics relative to the prior art end mills currently available.

SUMMARY OF THE INVENTION

According to the present invention, a rotary cutting end mill is provided. The end mill includes a shank section and a fluted section. The fluted section has a first end integrally attached to the shank section, a second end, and an outer surface. One or more helical teeth are disposed along the outer surface of the fluted section. Each helical tooth has a cutting surface and a relief wall that intersect to form an angle defining a helical cutting edge. The helical cutting edge defines an outer circumferential cutting path. The cutting surface includes first, second, and third sections, and first and second take-off peaks. The first take-off peak is disposed between the first section and second section. The second take-off peak is disposed between the second section and the third section.

Historically, milling centers were typically feed rate limited by the horsepower available or the ability of the end mills to disperse the material being removed. End mills typically could not operate at high speeds without a lot of noise, wear and flute clogging. Modern milling centers provide adequate horsepower to run at increased speeds. The present invention end mill is capable of running at high speed feed rates without clogging. As a result, the present end mill enables the milling center to be operated at a higher feed rate than is possible with most prior art end mills.

Another advantage provided by the present invention end mill is that it enhances chip removal with the cutting fluid/coolant during milling. The take-off peaks direct the chips away from the cutting surface and thereby expose a side of the chip to cutting fluid disposed within the flute. The cutting fluid cools the chip and decreases the chance that the chip will adhere to the cutting surface.

These and other objects and advantages will become more readily apparent from the more detailed discussion of the preferred embodiment taken in conjunction with the drawings wherein similar elements are identified by like numerals through several views.

BRIEF DESCRIPTION OF THE DRAWINGS

FIG. 1 is a side view of an end mill according to the present invention.

FIG. 2 is a transverse cross sectional view taken along line 2—2 in FIG. 1 which has been enlarged for purposes of illustration.

DETAILED DESCRIPTION OF THE INVENTION

Figure 3:
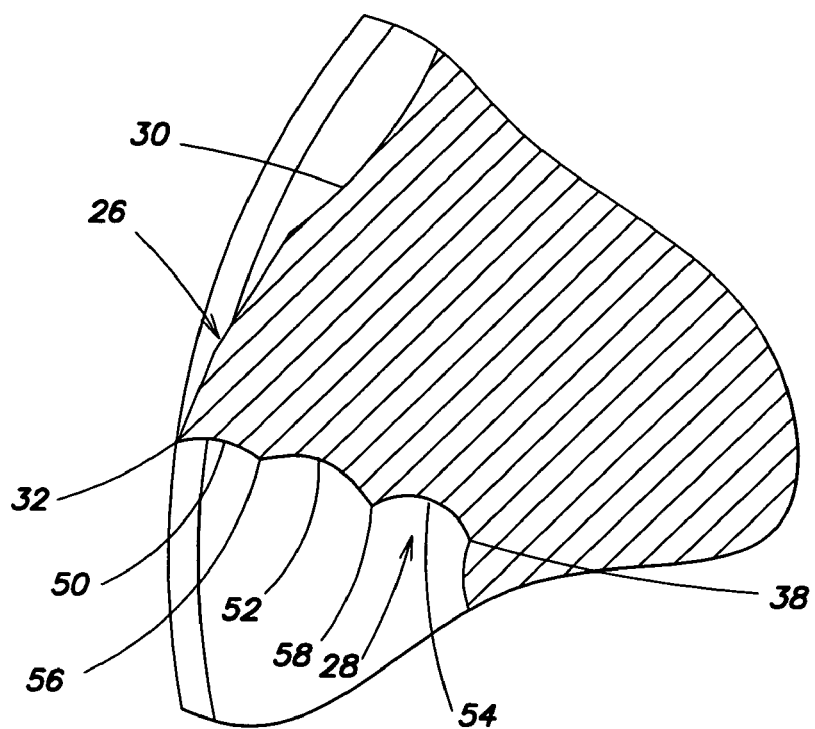
FIG. 3 is an enlarged fragmentary cross-sectional view of a cutting tooth of an end mill according to the present invention.
Figure 4:
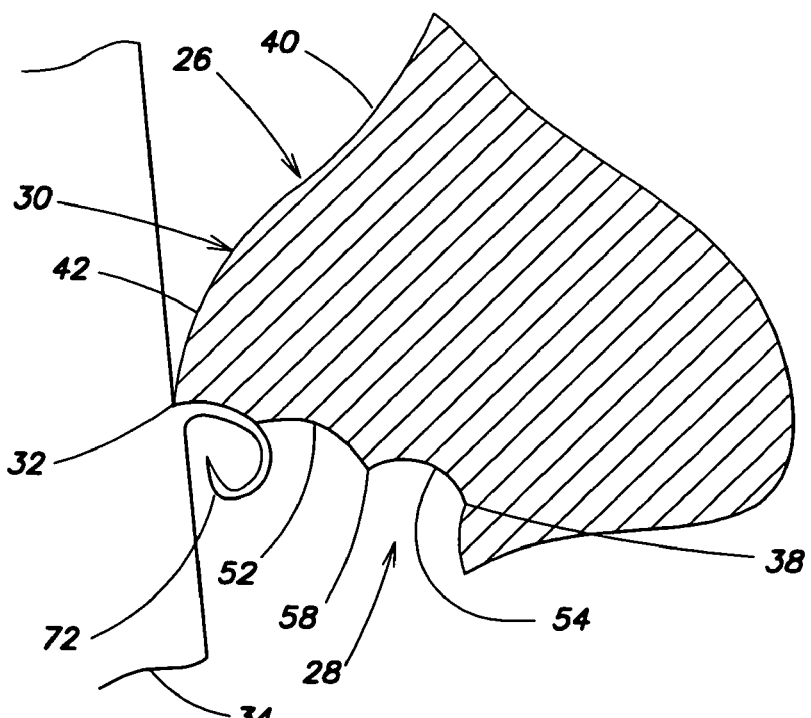
FIG. 4 is an enlarged fragmentary diagrammatic cross-sectional view of a cutting tooth of the present end mill cutting a chip.

Now referring to FIG. 1, a rotary cutting end mill 10 is shown that includes a shank section 12 and a fluted section 14, both of which extend along an axis of rotation 16. The shank section 12 is essentially cylindrical in shape and possesses two rectangular grooves 18 cut into its outer surface. The grooves 18, although not required, facilitate retention of the end mill 10 within some types of rotary driven apparatus (e.g., a milling machine). Acceptable end mill 10 materials include high strength steel/cobalt, ceramics, carbides, etc.

Figure 5:
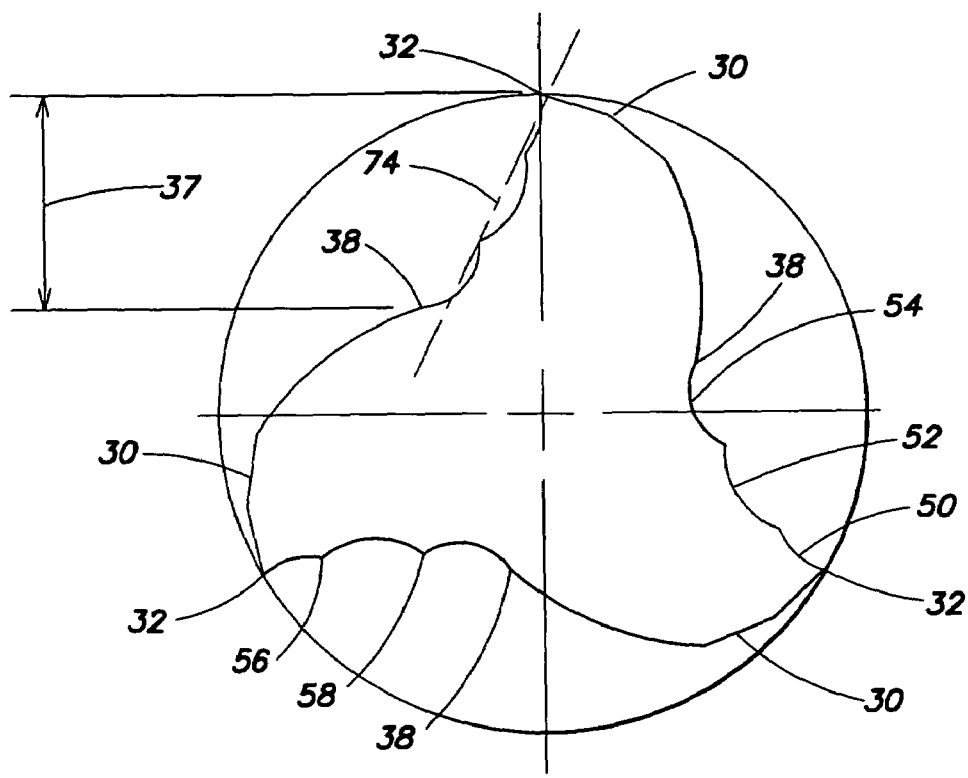
FIG. 5 is a side view of an end mill with three flutes according to the present invention.

The fluted section of end mill 10 has a first end 20 integrally attached to the shank section 12, a second end 22, and an outer surface 24. One or more helical teeth 26 are disposed along the outer surface 24 of the fluted section 14. FIG. 2 illustrates an embodiment having two helical teeth 26. FIG. 5 illustrates an embodiment having three helical teeth 26.

Now referring to FIGS. 2–6, each helical tooth 26 has a cutting surface 28 and a relief wall 30 that intersect to form an angle that defines a helical cutting edge 32. The helical cutting edge 32 defines an outer circumferential cutting path; i.e., the outermost edge contacting the work piece 34 (see FIG. 4). Arrow 36 indicates the rotational direction of the end mill 10. The length 37 (see FIG. 5) of the cutting surface 28 extends between the cutting edge 32 and an inflection point 38 of the flute curvature; i.e., where the concave shape of the cutting surface 28 of one tooth 26 changes to the convex shape of the relief wall 30 of the next tooth 26.

Figure 7:
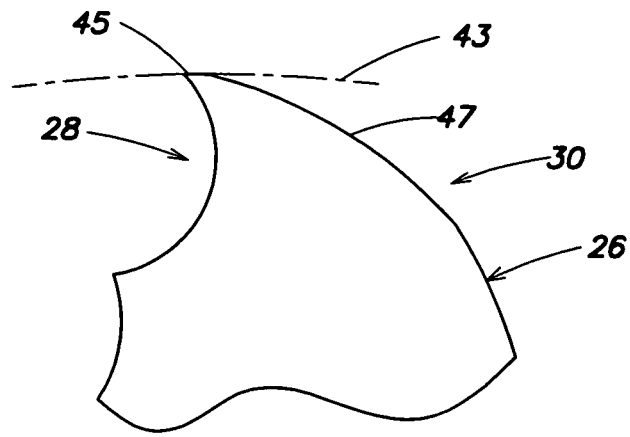
FIG. 7 is a diagrammatic partial view of a cutting tooth.
Figure 8:
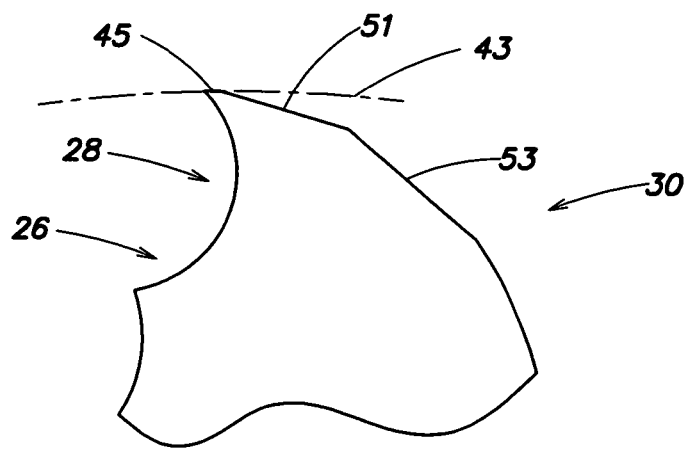
FIG. 8 is a diagrammatic partial view of a cutting tooth.
Figure 9:
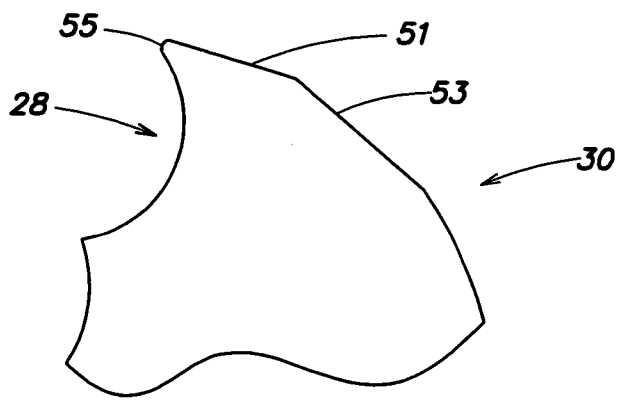
FIG. 9 is a diagrammatic partial view of a cutting tooth.

A variety of different relief wall 30 configurations can be used with the present invention end mill 10 and the present end mill 10 is not, therefore, limited to any particular configuration. For example, the helical tooth 26 shown in FIG. 4 has a relief wall 30 configuration that includes a pair of arcuately shaped sections 40, 42. The helical tooth 26 relief wall 30 embodiment shown in FIG. 6 includes a pair of linear shaped sections 44, 46, and an arcuate shaped section 48. The helical tooth relief wall 30 embodiment partially shown in FIG. 7 includes a cylindrically shaped first region 45 and an arcuately shaped second region 47. The first region 45 is disposed along the circumference 43 of the fluted section 14. The second region 47 extends inwardly away from the circumference 43 of the fluted section 14. The embodiment partially shown in FIG. 8 is similar to that shown in FIG. 7, also including a cylindrically shaped first region 45. Rather than an arcuately shaped second region 47, however, the embodiment shown in FIG. 8 includes a linear second region 51 and a linear third region 53. The helical tooth relief wall 30 embodiment partially shown in FIG. 9 includes a radiused edge 55 that extends between the cutting surface 28 and the relief wall 30. The radiused edge 55 is shown in FIG. 9 with a relief wall configuration that includes a linear second region 51 and a linear third region 53. In alternative embodiments, the radiused edge 55 can be used with an arcuately shaped relief wall 30.

The cutting surface 28 includes first 50, second 52, and third sections 54, and first 56 and second 58 take-off peaks. The first take-off peak 56 is disposed between the first section 50 and second section 52. The second take-off peak 58 is disposed between the second section 52 and third section 54. The first section 50 of the cutting surface 28 has a curvature that at least substantially follows a first radius. The second section 52 of the cutting surface 28 has a curvature that at least substantially follows a second radius. The first take-off peak 56 is the point of intersection between the first section 50 and the second section 52. The third section 54 of the cutting surface 28 has a curvature that at least substantially follows a third radius. The second take-off peak 58 is the point of intersection between the second section 52 and the third section 54. The first, second, and third sections 50, 52, 54 are not limited to circular shapes, and may follow a non-circular arcuate path. Hence, the description that each section 50, 52, 54 substantially follows a radius. The third section 54 is disposed between the second take-off peak 58 and the relief wall 30 of the adjacent tooth 26. The third section 54, and therefore the cutting surface 28, terminates approximately at the inflection point 38 of the flute curvature.

Figure 6:
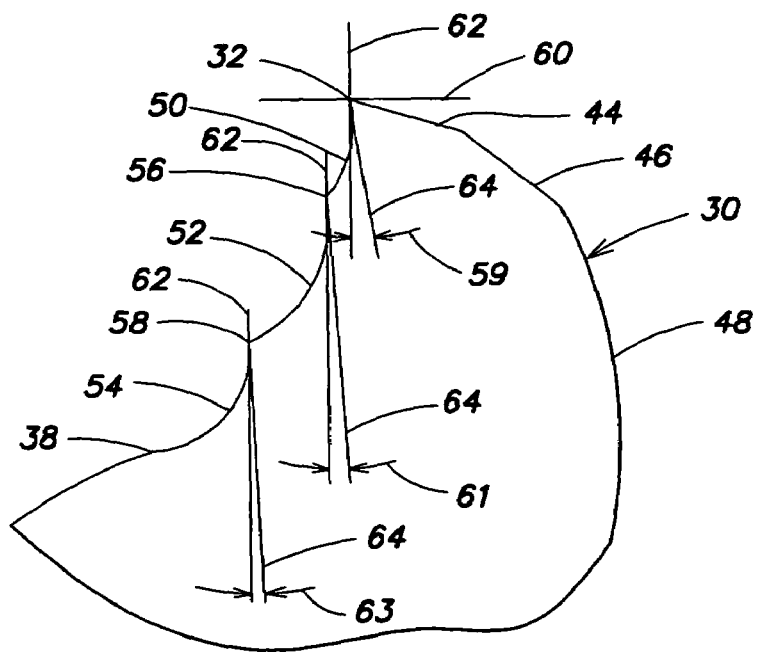
FIG. 6 is a greatly enlarged fragmentary cross-sectional view of the cutting edge of the cutting tooth of an end mill according to the present invention.

Referring to FIG. 6, each section 50, 52, 54 of the cutting surface 28 has a rake angle relative to a tangent line 60 disposed at the cutting edge 32. The tangent line 60 coincides with the plane of the surface of the work piece 34 formed by the rotating end mill 10. The rake angle is defined as the angle formed between a line 62 extending perpendicular to the tangent line 60, and the slope line 64 of the section at the cutting edge 32 (first section 50), or the slope line at the first take-off peak 56 (second section 52), or the slope line at the second take-off peak 58 (third section 54). The relative magnitudes of the first rake angle 59, second rake angle 61, and third rake angle 63 can be varied to suit the application at hand. In the embodiment shown in FIG. 6, for example, the first rake angle 59 is greater than the second rake angle 61, and the second rake angle 61 is greater than the third rake angle 63. The present invention is not limited to any particular combination of rake angles.

In all instances, the cutting surface sections 50, 52, 54 and the rake angles 59, 61, 63 collectively form a cutting surface 28 that is skewed relative to the rotational axis 16 of the end mill 10 (i.e., a line 74 extending substantially along the cutting surface 28 would not pass through the rotational axis 16; see FIG. 5).

The cutting teeth 26 embodiments shown in FIGS. 2–6 have identical helical teeth 26 configurations. In alternative embodiments, some or all of the teeth 26 may have different configurations of the above-described cutting surface 28.

The first section 50 of the cutting surface 28 is about 10–30% of the overall length 37 of the cutting surface 28. The third section 54 of the cutting surface 28 is about 50–75% of the overall length 37 of the cutting surface 28.

The second end 22 of the fluted section 14 can assume a variety of different configurations. For example, the twin flute embodiment shown in FIG. 1 shows a pair of end cutting surfaces 68 having an obtuse angle 70 disposed therebetween. In other embodiments, the end cutting surfaces 68 may be co-planar. The present invention end mill 10 is not limited to any particular second end configurations.

In the operation of the end mill 10, the end mill 10 rotating at a particular rotational speed is engaged with a work piece 34. One or both of the work piece 34 or the rotating end mill 10 traverses along a path relative to the other. As a result, each helical tooth 26 engages the work piece 34 and shears a portion of the work piece 34 off, thereby forming a chip 72. The curvature of the section of the cutting surface 28 engaging the work piece 34 influences the shape of the chip 72 formed. Hence, a chip 72 formed by the first section 50 of the cutting surface 28 engaging the work piece 34 will be guided along the first section 50 as it is formed from the work piece 34. The chip 72 will consequently likely assume a curvature similar to that of the first section 50. After some distance, the chip 72 will shear and separate from the work piece 34.

Ejection of the chip 72 from the flute is highly desirable to avoid clogging. The present invention end mill 10 facilitates chip 72 ejection in a number of different ways. One aspect of the present invention that facilitates chip 72 ejection is the difference in curvature of the sections 50, 52, 54 of the cutting surface 28. The difference in curvature between the first section 50 and second section 52 of the cutting surface 28, for example, eliminates the possibility that a chip 72 will be formed along the first section 50 having a curvature which mates with the second section 52. Consequently the chip 72 is more apt to be ejected than become bogged within or adhere to the second section 52. Another aspect of the present invention that facilitates chip 72 ejection is the interruptions formed in the cutting surface 28 by the take-off peaks 56, 58. The take-off peaks 56, 58 impede chip 72 travel along the cutting surface 28, urging the chip 72 instead to travel away from and out of the flute. Still another aspect of the present invention that facilitates chip 72 ejection is the differences in rake angle between the sections of the cutting surface 28. The differences in rake angle between the sections 50, 52, 54, create a cutting surface 28 that is skewed relative to the rotational axis 16 of the end mill 10 (i.e., a line 74 extending substantially along the cutting surface 28 would not pass through the rotational axis 16; See FIG. 5). The more "open" cutting surface 28 orientation facilitates chip 72 ejection and therefore helps prevent clogging. Still another aspect of the present invention that facilitates chip 72 ejection is that the "open" cutting surface 28 orientation makes it easier to get cutting fluid behind the chip 72 as it is being formed. The cutting fluid acts as a coolant that discourages attachment of the chip 72 to the cutting surface 28. The cutting fluid also is operable to flush chips 72 out of the flute.

Although this invention has been shown and described with respect to the detailed embodiments thereof, it will be understood by those skilled in the art that various changes in form and detail thereof may be made without departing from the spirit and the scope of the invention. For example, although the present invention was described in the context of an end mill, the invention is also applicable to other types of cutting tools, including router bits, taps, thread mills, and insertable helical tooling.

What is claimed is:

1. A rotary cutting end mill having an axis of rotation, comprising:
    a shank section extending along the axis of rotation;
    a fluted section extending along the axis of rotation, having a first end integrally attached to the shank section, a second end, and an outer surface; and
    one or more helical teeth disposed along the outer surface of the fluted section, each helical tooth having a cutting surface and a relief wall that intersect to form an angle defining a helical cutting edge;
    wherein the cutting surface includes a first section, a second section, a first take-off peak disposed between the first section and second section, a third section, and a second take-off peak disposed between the second section and the third section; and
    wherein the sections and take-off peaks are operable to direct material away from the cutting surface: and
    wherein the cutting surface has an open orientation relative to the cutting edge and the axis of rotation such that the second section and third section are disposed on a same side of a first line extending perpendicular from a second line that is circumferentially tangential to the end mill at the cutting edge, which first line passes through the axis of rotation.

2. The end mill of claim 1, wherein the first section is contiguous with the cutting edge.

3. The end mill of claim 1, wherein the first take-off peak extends substantially parallel to the cutting edge.

4. The end mill of claim 1, wherein the second take-off peak extends substantially parallel to the cutting edge.

5. The end mill of claim 1, wherein the first section has a first curvature that substantially follows a first radius.

6. The end mill of claim 5, wherein the second section has a second curvature that substantially follows a second radius, and the second radius is greater than the first radius.

7. The end mill of claim 6, wherein the third section has a third curvature that substantially follows a third radius, and the third radius is greater than the second radius.

8. The end mill of claim 1, wherein the first section has a first rake angle, and the second section has a second rake angle, and the first rake angle is different than the second rake angle.

9. The end mill of claim 8, wherein the third section has a third rake angle, and the second rake angle is different than the third rake angle.

10. A rotary cutting end mill, comprising:
    a shank section;
    a fluted section having a first end integrally attached to the shank section, a second end, and an outer surface; and
    one or more helical teeth disposed along the outer surface of the fluted section, each helical tooth having a cutting surface and a relief wall that intersect to form an angle defining a helical cutting edge;
    wherein the cutting surface includes a first section, a second section, a first take-off peak disposed between the first section and second section, a third section, and a second take-off peak disposed between the second section and the third section; and
    wherein the first section has a first curvature that substantially follows a first radius, the second section has a second curvature that substantially follows a second radius, and the third section has a third radius that substantially follows a third radius, and the third radius is greater than the second radius, and the second radius is greater than the first radius.

* * * * *